United States Patent [19]
Ando et al.

[11] Patent Number: 6,167,013
[45] Date of Patent: Dec. 26, 2000

[54] INFORMATION STORAGE MEDIUM AND INFORMATION REPRODUCING APPARATUS

[75] Inventors: Hideo Ando, Tokyo; Mikio Yamamuro, Yokohama, both of Japan

[73] Assignee: Kabushiki Kaisha Toshiba, Kawasaki, Japan

[21] Appl. No.: 09/049,115

[22] Filed: Mar. 27, 1998

[30] Foreign Application Priority Data

Mar. 28, 1997 [JP] Japan ..................................... 9-078534

[51] Int. Cl.[7] ....................................................... G11B 7/00
[52] U.S. Cl. ............................ 369/54; 369/275.4; 369/58
[58] Field of Search ................................ 369/54, 58, 59, 369/47, 48, 49, 32, 275.1, 275.2, 275.3, 275.4, 277

[56] References Cited

FOREIGN PATENT DOCUMENTS

| 588 305 | 3/1994 | European Pat. Off. |
|---|---|---|
| 36 20 331 | 1/1987 | Germany . |

*Primary Examiner*—Muhammad Edun
*Attorney, Agent, or Firm*—Pillsbury Madison & Sutro LLP

[57] ABSTRACT

The present invention provides an information storage medium that is manufactured to have a high yield. When information is to be reproduced by an information reproducing apparatus, there is little or no undesirable influence, such as oscillation or unstableness, from the reproducing apparatus onto the information storage medium. Thus, the information reproducing apparatus is capable of performing stable information reproductions. The information storage medium comprises a pre-groove having a groove-like, continuous projections-and-recess shape and a pre-pit having an intermittent projection-and-recess shape. The level difference of the depth or the height of the projections and recesses of the pre-pit is substantially equal to that of the pre-groove. Each of the pre-pit and pre-groove has a recording surface wobbling along a predetermined curved line. Utilizing a push-pull type of tracking error detection method, a reproduction signal with a high signal-to-noise (S/N) ratio can be obtained from the recording surface of the information storage medium. The push-pull tracking error detection method divides the reproduction light at its wave front into two components, and the difference between the sum of the light returning in the positive direction and the sum of the light returning in the negative direction is found to detect a variation amount.

10 Claims, 11 Drawing Sheets

INFORMATION STORAGE MEDIUM AND INFORMATION REPRODUCING APPARATUS

BACKGROUND OF THE INVENTION

The present invention relates to information storage media devices that already contain recorded information which can be reproduced using converged light, for example, compact disks (CD), laser disks (LD), compact disk-type read-only memory disks (CD-ROM) and digital versatile disk-type video disks (DVD). The present invention is also directed to devices that already contain recorded information which can be reproduced using converged light and wherein the already recorded information can be rewritten by using converged light, for example, optical disks (MO, OD, MD). Additionally, the invention also includes once-write-type CD-ROM disks (CD-R) that permit writing of information onto the surface of the information storage media. Furthermore, the invention relates to information reproducing apparatuses for reproducing information from the information storage media, writing information in the information storage media or rewriting already recorded information in the information storage media.

On an information storage medium containing optical characteristics, magnetic characteristics or shapes in a local area of a recording film surface are varied by using converged light to form small record marks where information is written or rewritten. Pre-grooves for decreasing a track pitch are formed to determine the radial intervals the record marks. The pre-grooves are arranged in groove shapes on the recording film surface on which record marks are to be formed.

At the time of information recording, a pre-groove (continuous groove) is traced by using a converged beam spot produced by a recording/reproducing apparatus, and record marks are successively formed in the pre-groove or on a land portion between pre-grooves.

The pre-groove is basically formed in a continuous spiral shape on one recording surface of the information storage medium. However, if microscopically viewed, the pre-groove is interrupted at boundaries of sectors by the sectors which are very finely divided along the pre-groove. Pre-pits having very small concave shapes are formed at interrupt portions between the pre-grooves. For example, the pre-pits have information representing the sector numbers assigned to the individual sectors. In many cases, the pre-pits also have sync codes representing a reference clock at the time of information reproduction.

Suppose that a diameter of a reproducing beam spot having central intensity $e^{-2}$ is Ws, the used wavelength of reproduced light is $\lambda$, the refractive index of a transparent plastic base plate of the information storage is n, the width of the pre-groove is Wt, the depth of the pre-groove is dt, the width of the pre-pit is Wp, and the depth of the pre-pit is dp. When a laser beam emitted from an optical head of the information reproducing apparatus is converged on the information storage medium through an objective lens and a pre-pit signal is reproduced on the basis of a variation in the amount of light which is included in reflection light from the information storage medium and has passed once again through the objective lens, it is generally said that a maximum reproduction signal is obtained when the following condition is satisfied:

$$Wp \approx Ws/3,\ dt \approx \lambda/(4n) \qquad\qquad (A)$$

When a push-pull method is employed, wherein light, which has been reflected by the information storage medium and has passed once again the objective lens, is divided into two components by wave front division with respect to a straight line including a center axis and a difference between the two components is detected to find a tracking error, it is generally said that a maximum tracking error signal is obtained when the following condition is satisfied:

$$Wt \approx Ws/2,\ dp \approx \lambda/(8n) \qquad\qquad (B)$$

If the width and depth of the pre-pit are plotted on an abscissa and a detection signal is plotted on an ordinate of a graph, a maximum value is obtained when formula (B) is satisfied. Thus, even if the width and depth of the pre-pit are slightly varied near the optimal values, the detection signal does not substantially vary. By contrast, in a case where the width and depth of the pre-groove depart from optimal values, the detection signal greatly varies even if the width and depth are slightly varied.

However, for reasons relating to the manufacture, as described below, it is difficult to form both the pre-pit and pre-groove with optimal shapes. The following problems (1) to (4) arise.

1) Either the pre-pit shape or the pre-groove shape is less regarded in manufacture, and the detection signal of the less regarded one decreases and the precision of detection deteriorates.

2) Since either the pre-pit shape or the pre-groove shape does not satisfy with the optimal shape, the detection signal varies very sensitively to a slight variation in depth or width. As a result, detection signals vary greatly from manufacturing lot to manufacturing lot of information storage media, and the manufacturing yield of information storage media decreases considerably. Since output signals depart from maximum values if the optimal conditions are not met, as described above, detection signals vary greatly in relation to the variation in width and depth.

3) The amount of exposure light on a primary disk on a primary disk recording apparatus for information storage media needs to be varied in at least three levels (three-level exposure amount including zero-level). It is very difficult to vary the exposure amount stably in multiple levels and to ensure high exposure precision in each level.

4) As a result, there is difficulty in manufacturing information storage media, and the manufacturing yield decreases and the manufacturing cost of information storage media increases.

The structure of the conventional information storage medium as well as the method of manufacturing the same will now be described, and the problems of the prior art explained in detail.

The information storage medium is manufactured according to steps (a) to (e):

a) forming a primary disk,→ b) forming a stamper by electroforming plating,→ c) forming a plastic base plate by injection molding,→ d) forming a recording film by deposition, and e) bonding.

Pre-grooves and pre-pits are first formed on the recording film by step (a) of forming the primary disk.

The most important problem in this case is that the pre-groove and pre-pit have different optimal depths ($dt \approx \lambda/(4n)$; $dp \approx \lambda/(8n)$).

In order to meet the two conditions of depth, the use of a photoresist layer having a two-layer structure was proposed. However, high-quality recording cannot be achieved due to cross-talk between the two layers of the photoresist in an exposure/development step.

Even when two layers, a metal film of, e.g. Te (tellurium) and a photoresist layer, are used, this structure cannot practically be used because of rims of Te near holes.

Considering the disadvantages above, in order to stably form pre-grooves and pre-pits with high productivity, it is essential to use a single-layer photoresist in forming a primary disk. This condition is unchanged even now.

Under the circumstances, in the prior art, the amount of exposure light on the photoresist layer is controlled in the step of exposing the primary disk, thereby varying the depths of the pre-groove and pre-pit.

FIG. 1 shows the shapes and dimensions of the obtained pre-grooves and pre-pits on the primary disk of a conventional information storage medium. If the transfer efficiency in steps (b), (c) and (d) in the primary disk manufacturing process is 100%, the shapes and dimensions of the pre-grooves and pre-pits formed on the recording film of the information storage medium agree with those of the pre-grooves and pre-pits formed on the primary disk.

Referring to FIG. 1, the depth dt of the pre-groove 11 is about $\lambda/(8n)$. The reason is that the laser beam does not reach the bottom face of the photoresist layer (i.e. the position of a glass plate) because the amount of light the laser beam is set at a low level, despite the thickness dr of the photoresist layer being set at $\lambda/(4n)$. In addition, since the exposure amount is small, the width Wt of the pre-groove 11 is very narrow.

By contrast, the depth dp of the pre-pit 12 is about $\lambda/(4n)$ which is equal to the thickness dr of the photoresist layer, because the light amount of the laser beam is increased and the photoresist layer can be exposed even to the bottom face thereof. The width Wp of the pre-pit 12 is, as mentioned above, Wp≈Ws/3.

Consequently, the conventional structure of the information storage medium as shown in FIG. 2 has the following problems.

f) Although the shape of the pre-pit 12 is so determined as to obtain a maximum reproduction signal, g) the width Wt of the pre-groove 11 is very small and greatly differs from an ideal value, Wt≈Ws/2. Thus, a tracking error detection signal obtained by a push-pull method decreases greatly. Because of deficiency of the detection signal, the information reproducing apparatus cannot stably control the tracking and tracking errors often arise.

h) If the conditions for manufacture are the same, the depth dt of the pre-groove 12 is dt≈$\lambda/(8n)$. However, the depth dt greatly varies due to a slight variation in conditions for development in a developing step (e.g. concentration of developing liquid, developing time, room temperature at the time of development). As a result, amplitudes of tracking error detection signals vary greatly from manufacturing lot from manufacturing lot. When information is to be reproduced by the information reproducing apparatus, a tracking error control circuit cannot be used in the case of a specific information storage medium since it oscillates due to an excessively large tracking error detection signal. In the case of another information storage medium, the tracking error detection signal is too large to stably correct a tracking error, and tracking errors often arise.

BRIEF SUMMARY OF THE INVENTION

The object of the present invention is to provide an information storage medium, which is manufactured with high yield and is little influenced by a reproducing apparatus, and an information reproducing apparatus capable of performing stable information reproduction.

This invention provides an information storage medium permitting reproduction of information with use of converged light, comprising:

a pre-groove region having a groove-like, continuous projection-and-recess shape; and a pre-pit region having intermittent projection-and-recess shape, wherein the pre-groove region includes a groove portion in a pre-groove and a land portion between grooves, pre-pits are arranged at positions departing from an extension line of the pre-groove or an extension line of the land portion, and a level difference (depth or height) dp of the pre-pit satisfies the condition of $$m\lambda/(4n)+\lambda/(124n) \leq dp \leq m\lambda/(4n)+(15\lambda)/(62n)$$

where m: an integer, and n: a refractive index of a base plate of the information storage medium.

This invention also provides an information reproducing apparatus capable of reproducing information from an information storage medium with use of converged light, comprising:

a light source;

an optical detector for detecting light emitted from the light source and reflected by the information storage medium, the optical detector including a first optical detection portion for detecting a first light component reflected by the information storage medium and a second optical detection portion for detecting a second light component reflected by the information storage medium; and a differential circuit for finding a difference between a first signal obtained from the first optical detection portion and a second signal obtained from the second optical detection portion, wherein a reproduction signal from a pre-pit recorded on the information storage medium is obtained by using an output signal from the differential circuit.

This invention also provides an information reproducing apparatus capable of recording/reproducing, with use of converged light, information in/from an information storage medium having a pre-groove with a groove-like, continuous projection-and-recess shape and a pre-pit with an intermittent projection-and-recess shape, the information storage medium permitting write or rewrite with use of converged light, the apparatus comprising:

at least one system of a differential circuit for reproducing a signal from the pre-pit; and at least one system of an adder for reproducing information from a record mark formed by write or rewrite, wherein the following condition is satisfied:

$$|Ip|/Io > 0.1$$

where

Io: an output signal from the adder in association with the pre-groove or a non-pre-groove portion without the projection-and-recess shape, and Ip: a signal amplitude of an output from the differential circuit.

This invention also provides an information reproducing apparatus capable of recording/reproducing, with use of converged light, information in/from an information storage medium having a pre-groove with a groove-like, continuous projection-and-recess shape and a pre-pit with an intermittent projection-and-recess shape, the information storage medium permitting write or rewrite with use of converged light, the apparatus comprising:

at least one system of a differential circuit for reproducing a signal from the pre-pit; and at least one system of an adder for reproducing information from a record mark formed by write or rewrite, wherein the following condition is satisfied:

$$Ipp/Io>0.1$$

where

Io: an output signal from the adder in association with the pre-groove or a non-pre-groove portion without the projection-and-recess shape, and Ipp: a signal amplitude of a positive output from the differential circuit.

This invention also provides an information reproducing apparatus capable of recording/reproducing, with use of converged light, information in/from an information storage medium having a pre-groove with a groove-like, continuous projection-and-recess shape and a pre-pit with an intermittent projection-and-recess shape, the information storage medium permitting write or rewrite with use of converged light, the apparatus comprising:

at least one system of a differential circuit for reproducing a signal from the pre-pit; and at least one system of an adder for reproducing information from a record mark formed by write or rewrite, wherein the following condition is satisfied:

$$Imp/Io>0.1$$

where

Io: an output signal from the adder in association with the pre-groove or a non-pre-groove portion without the projection-and-recess shape, and Imp: a signal amplitude of a negative output from the differential circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

At first, a process of fabricating an information storage medium of the present invention will be described with reference to FIGS. 4A to 4E and FIGS. 5A to 5F.

Figure 4A:
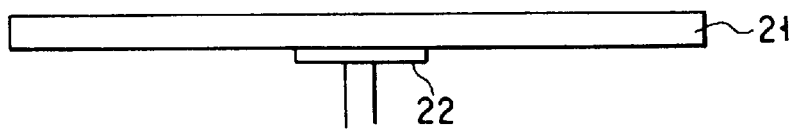
FIGS. 4A to 4E schematically show steps of manufacturing the information storage medium shown in FIG. 1.

As is shown in FIG. 4A, a tempered glass plate 21 about 0.5 to 30 mm thick is placed on a spindle motor 22 and rotated at a specific number of rotations, thereby ensuring surface precision.

A photoresist liquid dissolved in an organic solvent is coated on the glass plate 21, and the photoresist liquid is uniformly spread by making use of the centrifugal force of the rotating glass plate 21. This coating method is called a spinner coating method.

Figure 4B:
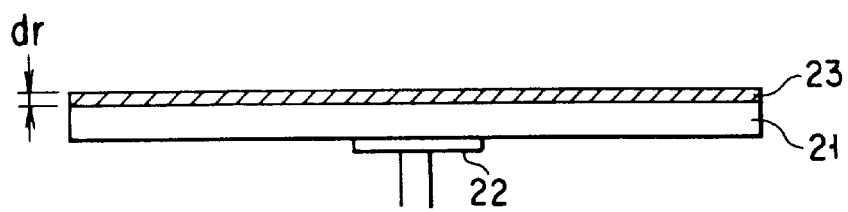

Then, as shown in FIG. 4B, the glass plate 21 is left for a predetermined time period at high temperatures of 60 to 300° C., and the organic solvent is evaporated. Thus, a photoresist layer 23 with uniform thickness dr is formed. In this case, it is supposed that there is no decrease in transfer efficiency as mentioned later in the steps of FIGS. 5A to 5F. If the transfer efficiency is 100% throughout all steps, the thickness dr of the photoresist 23 corresponds to the depth of the pre-pit or pre-groove of a recording film 34 of the finished information storage medium.

Figure 4C:
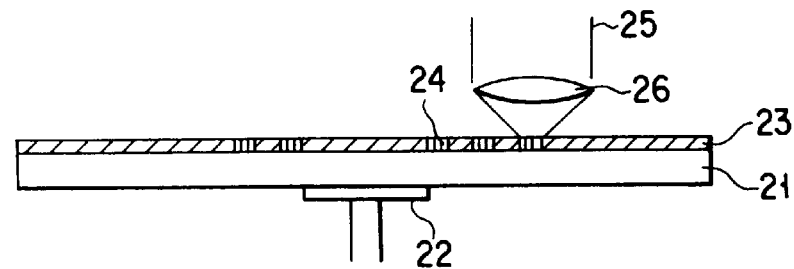

Subsequently, as shown in FIG. 4C, a laser beam 25 is converged on the photoresist layer 23 through an objective lens 26 and the photoresist 23 is exposed intermittently, thereby forming exposed portions 24.

Figure 4D:
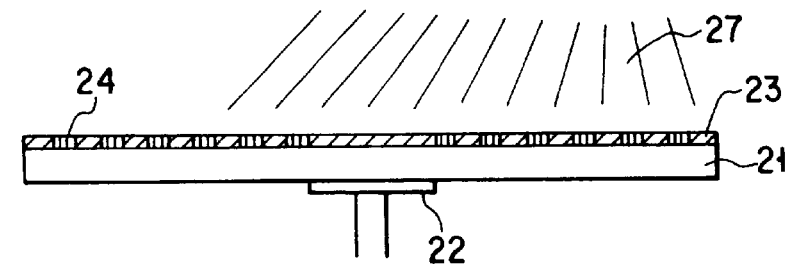

In FIG. 4D, the glass plate 21 which has been exposed is removed from a primary disk recording apparatus, and a developing liquid 27 is supplied to the glass plate 21 while the glass plate 21 is being rotated. Thus, the photoresist layer 23 is developed.

Figure 4E:
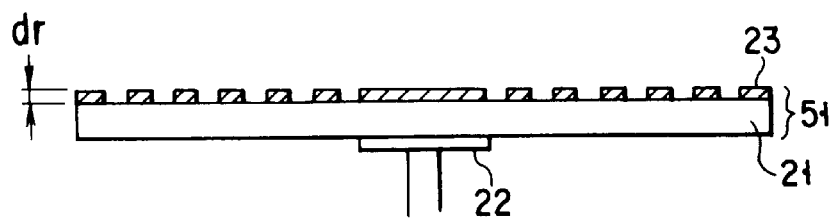
Figure 5A:
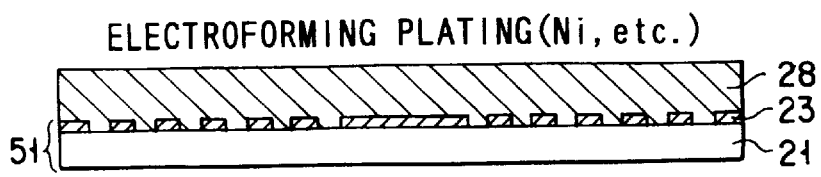
FIGS. 5A to 5F schematically show steps following the step shown in FIG. 4E.

If the development of the photoresist layer 23 is completed, the exposed portions 24 are dissolved, as shown in FIG. 4E to produce projections and recesses with height (depth) dr. The combination of thus formed glass plate 21 and photoresist layer 23 is called the primary disk 51 of the information storage medium 52 As is shown in FIG. 5A, a projection-and-recess pattern on the primary disk 51 is duplicated by electroless plating using, e.g. Ni (nickel) or electroplating (electroforming plating), and a replica is formed. The replica thus formed is called a master plate 28.

Using an organic solvent such as acetone, the photoresist layer 23 lying between the primary disk 51 and master plate 28 is removed, and the master plate 51 is separated from the primary disk 51.

Figure 5B:
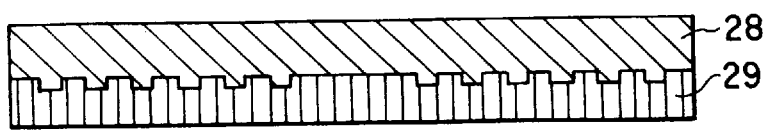
Figure 5C:
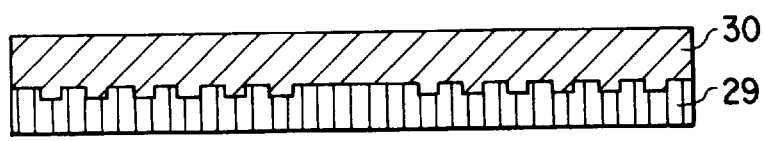

On the basis of the master plate 28, a mother plate 29 is formed by electroplating (electroforming plating), as shown in FIG. 5B. Then, on the basis of ti the mother plate 29, a stamper 30 is formed by electroplating (electroforming plating).

In general, a transparent plastic base plate 33 of the information storage medium is formed by injection molding.

Figure 5D:
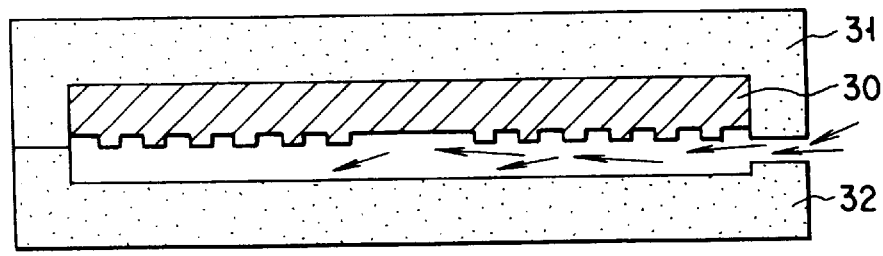

Specifically, as shown in FIG. 5D, a molten resin material (generally, polycarbonate (PC), acryl (PMMA), ABS) is put in a space between metal mold A 31 and metal mold B 32. The stamper 30 formed in the preceding step is attached to the metal mold A 31. At the time the resin material is inserted, a fine projection-and-recess pattern of the stamper 30 is transferred onto the resin material.

The metal mold A 31 and metal mold B 32 in which the resin material is inserted are left for several minutes and cooled to room temperature. When the resin material is cooled and solidified, the metal mold A 31 is separated from the metal mold B 32 and the plastic base plate 33 (the resin material on which the projection-and-recess pattern has been transferred plastic base plate "plastic base plate") is removed.

Figure 5E:
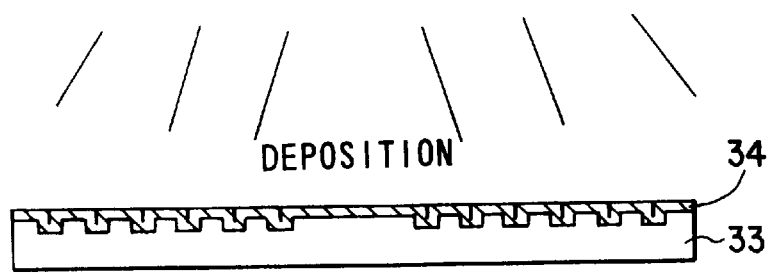

The plastic base plate 33 is disposed in a vacuum, and a recording film 34 is formed on the plastic base plate 33 by means of deposition such as vacuum deposition or ion plating, as shown in FIG. 5E.

Figure 5F:
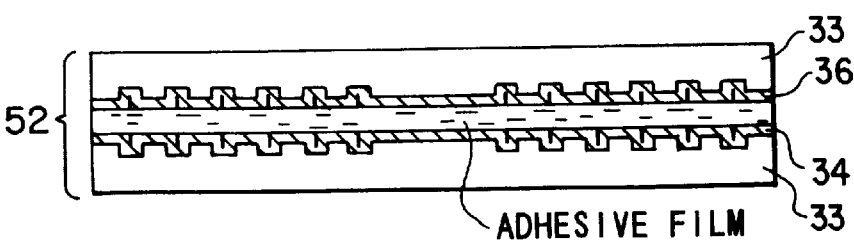

The two recording films 34 and 36 thus formed are arranged to face each other, and an adhesive film is filled between them, and the information storage medium 52 as shown in FIG. 5F is obtained.

Figure 6:
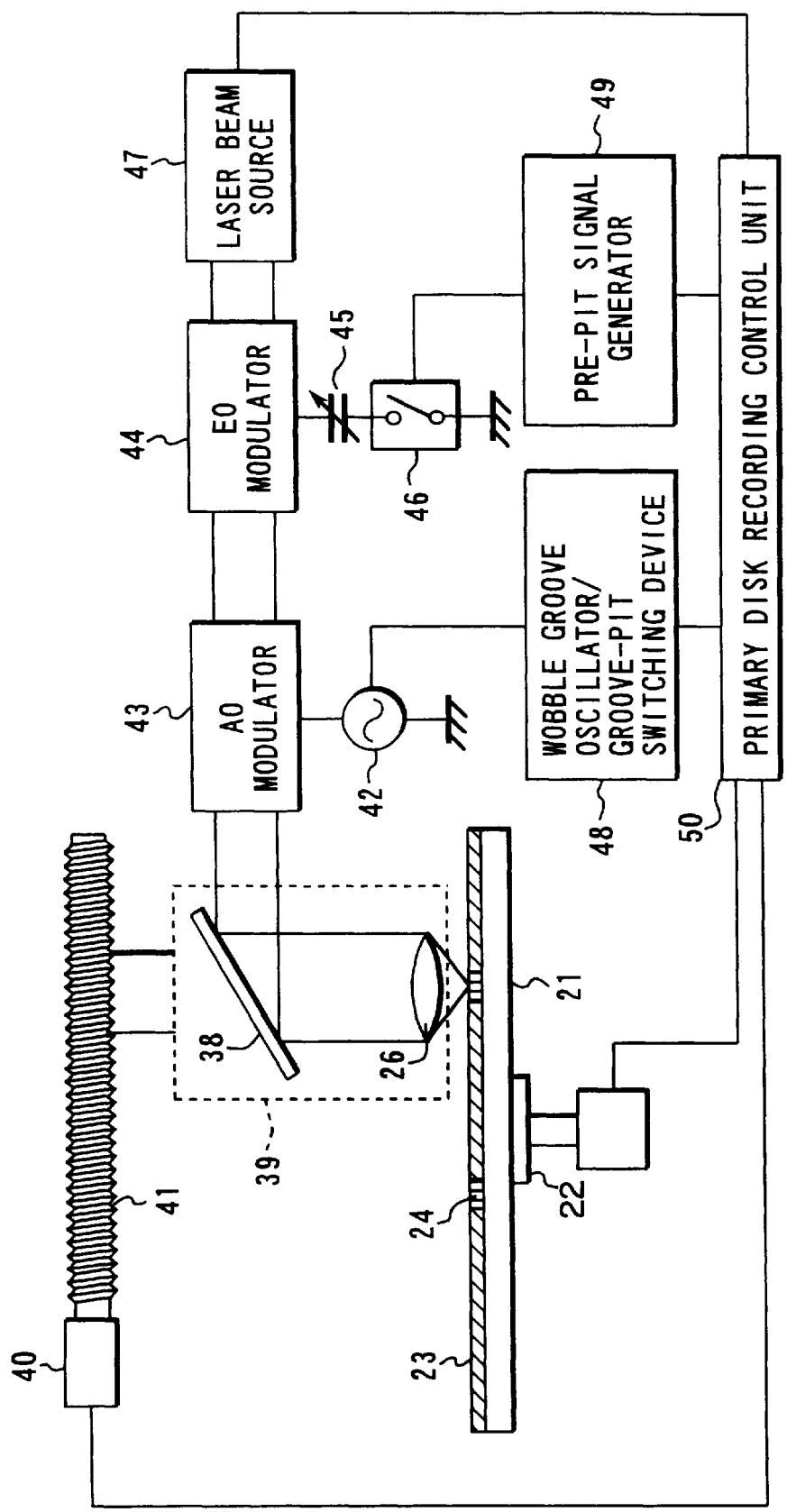
FIG. 6 schematically shows an example of a primary disk manufacturing apparatus for use in the steps of manufacturing a primary disk as shown in FIGS. 4A to 4E and FIGS. 5A to 5F.

FIG. 6 shows the structure of the primary disk recording apparatus for locally exposing the photoresist layer 23, as shown in FIG. 4C.

As has been described above, the glass plate 21 is rotated at a specific number of rotations on the spindle motor 22.

The laser beam 25 reflected by a deflecting mirror 38 and is converged on the photoresist layer 23 by means of the objective lens 26. The deflecting mirror 38 and objective lens 26 are constituted as a movable unit 39 and moved as one body in the radial direction of the glass plate 21.

The movable unit 39 is moved by a feed motor 40 and a feed gear 41. The movable unit 39 has a monitor portion (not shown) for optically monitoring a converged beam spot on the glass plate 21. A primary disk recording control unit 50 controls the number of rotations of the spindle motor 22 in accordance with a monitor output so that the movement speed (linear speed) of the converged beam spot relative to the glass plate 21 is always unchanged.

The laser beam 25 emitted from a laser beam source 47 reaches the deflecting mirror 38 through an EO (electrooptical) modulator 44 and an AO (acoustooptical) modulator 43.

A high-speed switch 46 is turned on/off by a pre-pit signal representing a fine projection-and-recess pattern, which is generated from a pre-pit signal generator 49, and a voltage from a variable voltage generator 45 is applied and not applied to the EO modulator 44.

If the voltage applied to the EO modulator 44 is varied, the amount of the laser beam which has passed through the EO modulator 44 varies.

The amount of the laser beam reaching the photoresist layer 23 is thus varied, and the exposed portions 24 and non-exposed portions are formed on the photoresist layer 23.

On the other hand, a voltage of a specific frequency is applied from a specific frequency oscillator 42 to the AO modulator 43. As a result, standing waves (inter-modular compression waves in the AO modulator 43) having a specific distance cycle occur in the AO modulator 43. The laser beam is Bragg-reflected by the standing waves and deflected in a specific direction.

Accordingly, the distance cycle of the standing waves varies and the Bragg conditions vary. Thus, the angle of the laser beam 25 is changed. Specifically, the direction of propagation of the laser beam 25 varies by changing the output frequency of the specific frequency oscillator 42. As result, the converged beam spot on the photoresist layer 23 shifts in the radial direction.

In the case of an information storage medium wherein a pre-groove 1 is wobbling at a predetermined cycle, the frequency of the specific frequency oscillator 42 varies at a predetermined cycle in accordance with an output from a wobble groove generator/wobble pit switching device 48. In the case of a wobble pit, the frequency of the specific frequency oscillator 42 is varied so that the converged beam spot is displaced in the radial direction on the photoresist layer 23 by half the track pitch (land-groove pitch).

Figure 3:
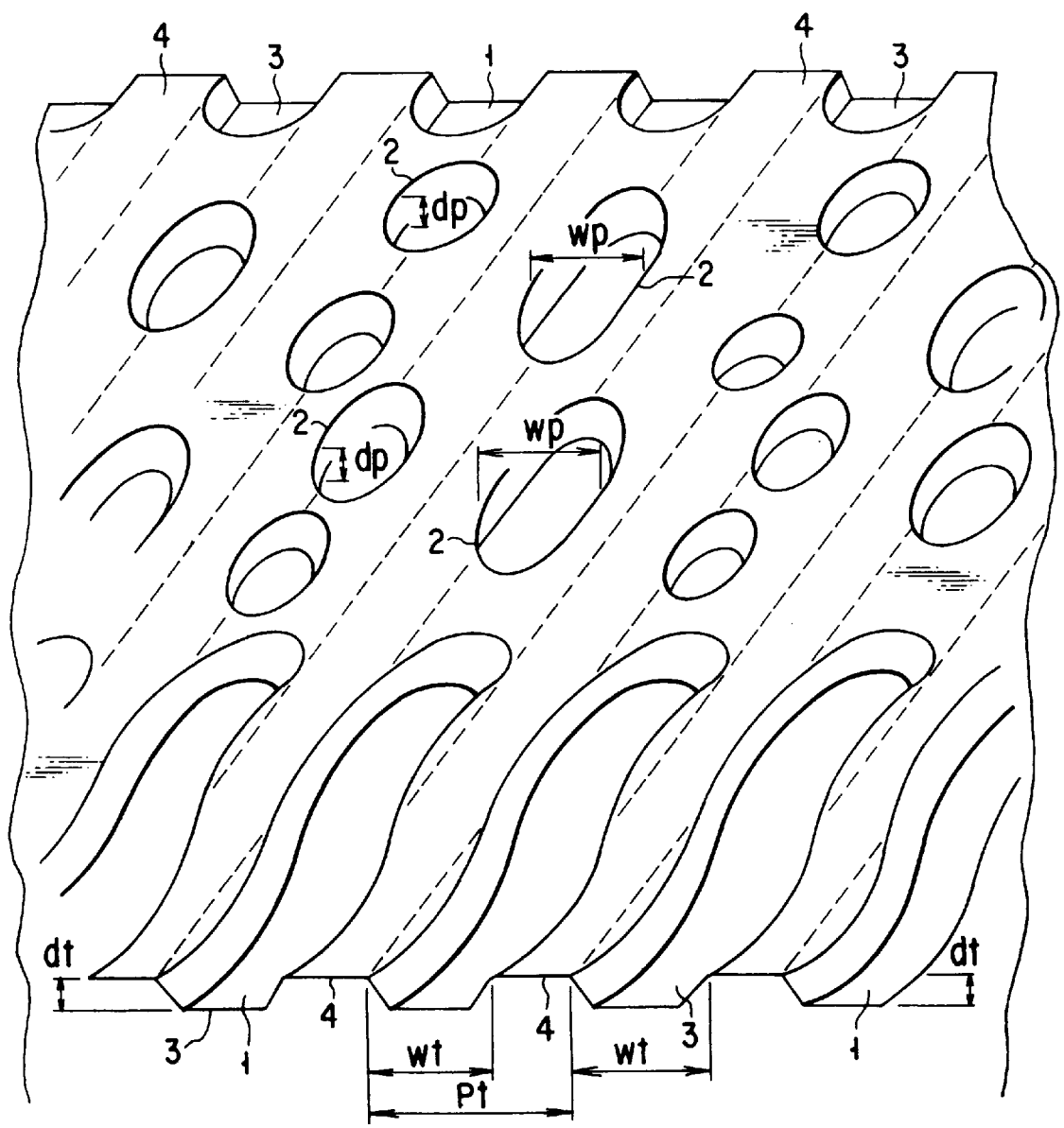
FIG. 3 is a partially enlarged view schematically showing a recording surface of an information storage medium according to an embodiment of present invention.

FIG. 3 shows the structure of the recording film 34, 36 formed through the above-described steps. The dimensions of respective portions shown in FIG. 3 are all values on the recording film 34, 36. Taking into consideration a decrease in transfer efficiency at the time of forming the pre-groove and pre-pit replica through the steps shown in FIGS. 5A to 5F, the depth and width on the primary disk 51 are optimally varied.

As is shown in FIG. 3, the pre-groove 1 is cut intermittently by sectors. Pre-pits 2 are formed on sector portions between the pre-grooves 1.

A flat portion of the pre-groove 1, which is located between groove portions 3 is called a land portion 4.

When the information storage medium shown in FIG. 3 is formed, a recording method called a land/groove recording method is adopted. Although not shown, writable or rewritable record marks are formed in the groove portion 3 and on land portion 4.

The pre-groove 1 is wobbling in a small range of amplitude, as shown in FIG. 3,

[1] in order to be used for rotational synchronism of the motor for rotating the information storage medium, and

[2] to obtain sync signals for reproducing and recording information from the information storage medium.

A principle for detecting a tracking error by use of the pre-groove 1 will now be described with reference to FIGS. 8A to 8C.

Figure 8A:
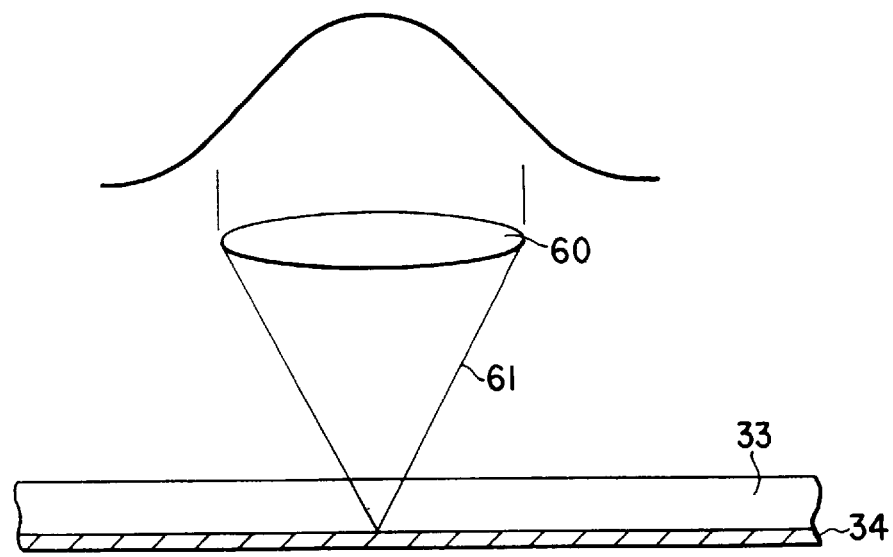
FIGS. 8A to 8C are schematic views for describing an intensity distribution of a laser beam reflected from the recording surface shown in FIG. 3.

In many cases, the intensity distribution of a laser beam 61, before it is made incident on an objective lens from a light source (not shown), is a Gauss distribution, as shown in FIG. 8A.

When the recording film 34 is flat and with no pre-groove, the laser beam 61 is reflected by the recording film 34 of the information storage medium and passes once again through the objective lens 60. In this case, the intensity distribution of the laser beam 61 is almost similar to the intensity distribution before incidence.

Figure 8B:
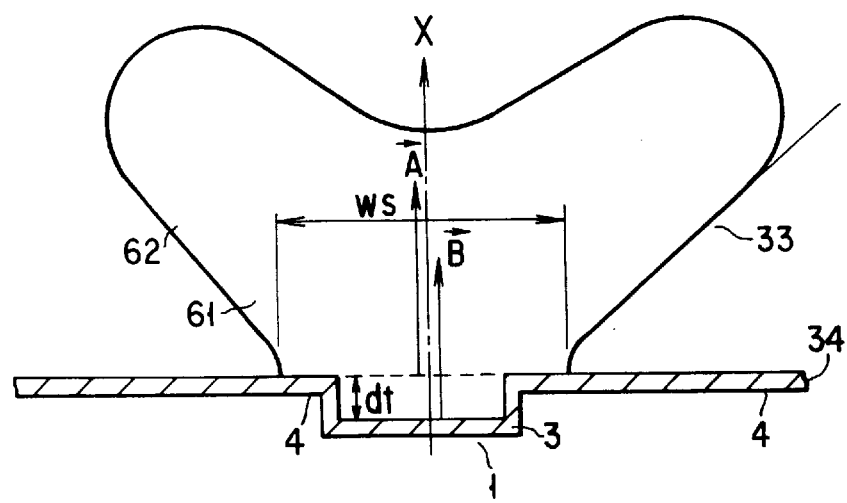

A description will then be given of a case where the center of the laser beam 61 coincides with the center of the groove portion 3 of the pre-groove 1, as shown in FIG. 8B.

The sum of amplitude of light reflected by the land portion 4 is expressed by A. For the purpose of simplicity of calculations, the reflection light from all land portions 4 is represented by imaginary reflection light Ar from a position of center of gravity of the land portions 4. When the center of laser beam 61 coincides with the center of groove portion 3, the system is to be considered and thus the reflection light Ar agrees with the center of optical axis.

$$Ar = A\exp(ikx) \quad (1)$$

$$\text{wherein } k = 2\pi/\lambda_N \quad (2)$$

Value $\lambda_N$ represents the wavelength of laser beam 61 passing through the plastic base plate 33 and has the following relationship with the wavelength $\lambda$ of laser beam 61 in vacuum and refractive index n of the plastic base plate 33:

$$\lambda_N = \lambda/n \quad (3)$$

The sum of amplitude of light reflected by the groove portion 3 is expressed by B.

For the purpose of simplicity of calculations, the reflection light from all groove portions 3 is represented by reflection light Br from a position of center of gravity of the groove portions 3. Because of symmetry of the system, Br agrees with the center of the optical axis.

Since the reflection light Br reflected toward the center of optical axis of the objective lens 60 has a phase delay relative to Ar by an amount corresponding to a double-path amount of the depth dt of the pre-groove 1, Br is expressed by $$Br = B\exp(ikx + ik2dt) \quad (4)$$

If the condition for standardization is set by $$A + B = 1 \quad (5)$$

equation (1) is modified as follows:

$$Ar = (1-B)\exp(ikx) \quad (6)$$

Accordingly, the sum of complex amplitude of the reflection light is given by $$\begin{aligned}\phi &= \exp(ikx) + B\exp(ikx + ikt)\{\exp(ikdt) - \exp(-ikdt)\} \quad (7)\\ &= \exp(ikx) + i2B\sin(kdt)\exp(ikx + ikdt)\\ &= \exp(ikx)\{1 + i2B\sin(kdt)\exp(ikdt)\}\end{aligned}$$

If equation (7) is used, the reflection light intensity is converted to $$\begin{aligned}|\phi|^2 &= 1 + i2B\sin(kdt)\{\exp(ikdt) - \exp(-ikdt)\} + \quad (8)\\ &\quad 4B2\sin^2(kdt)\\ &= 1 - 4B\sin^2(kdt) + 4B2\sin^2(kdt)\\ &= 1 - \{1 - 4(B - 1/2)^2\}\sin^2(kdt)\end{aligned}$$

Equation (8) signifies:

i] When B=0 (groove width Wt=0, or with no groove), $|\psi|^2=1$, and 100% of light returns with no interference.

ii] When B=1 (groove width Wt being greater than converged beam spot size Ws), $|\psi|^2=1$, and 100% of light returns with no interference, like item [i].

iii] When A=B=½ (the sum of amplitude of reflection light from the groove portions 3 coinciding with that of amplitude of reflection light from the land portions 4), $|\psi|^2$ takes a minimum value, $1-\sin^2(kdt)$.

In other words, in case [iii], maximum interference occurs and the amount of reflection light decreases to a lowest level (i.e. a large modulation degree of reproduction signal is obtained).

iv] When kdt $= m\pi$ (m: an integer), $|\psi|^2=1$, and 100% of light returns with no interference.

v] When kdt=(m+½) (m: an integer (including zero or a negative value), $|\psi|^2$ takes a minimum value, $1-\{1-4(B-\frac{1}{2})^2\}$.

Specifically, in case [v], like case [iii], maximum interference occurs and the amount of reflection light decreases to a lowest level (i.e. a large modulation degree of reproduction signal is obtained).

Figure 8C:
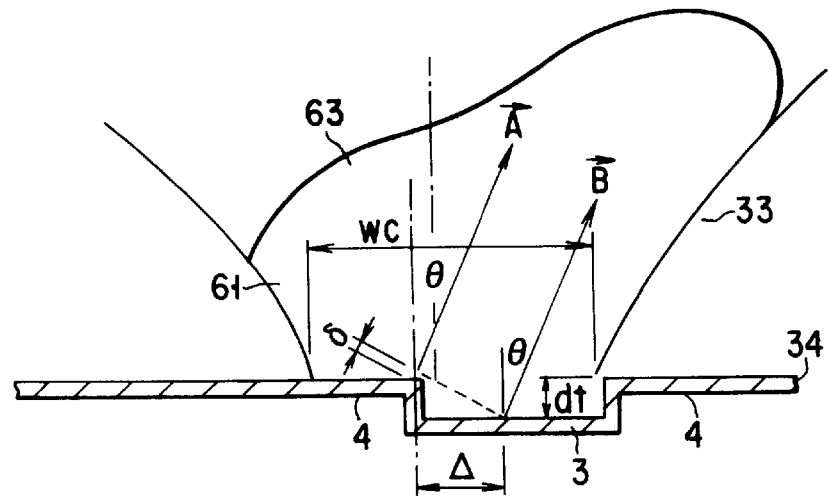

An analysis will now be made on a diffraction light amplitude distribution in a case where a converged beam spot center departs from the center of the groove portion 3 and diffraction light is inclined by θ from the optical axis, as shown in FIG. 8C.

Suppose that the sum of amplitude of reflection light from the groove portion 3 is B, the sum of amplitude of reflection light from the land portion 4 is A, a distance between the center of gravity of reflection light from the groove portion 3 and an imaginary center of gravity of reflection light from the land portion 4 is Δ, and a level difference between the groove portion 3 and land portion 4 is dt.

As is shown in FIG. 8C, if an optical path difference between two reflected waves is expressed by δ and the optical path difference dt before reflection is considered, a phase error between the two waves reflected in θ direction is given by $$dt - \delta$$

Figure 9:
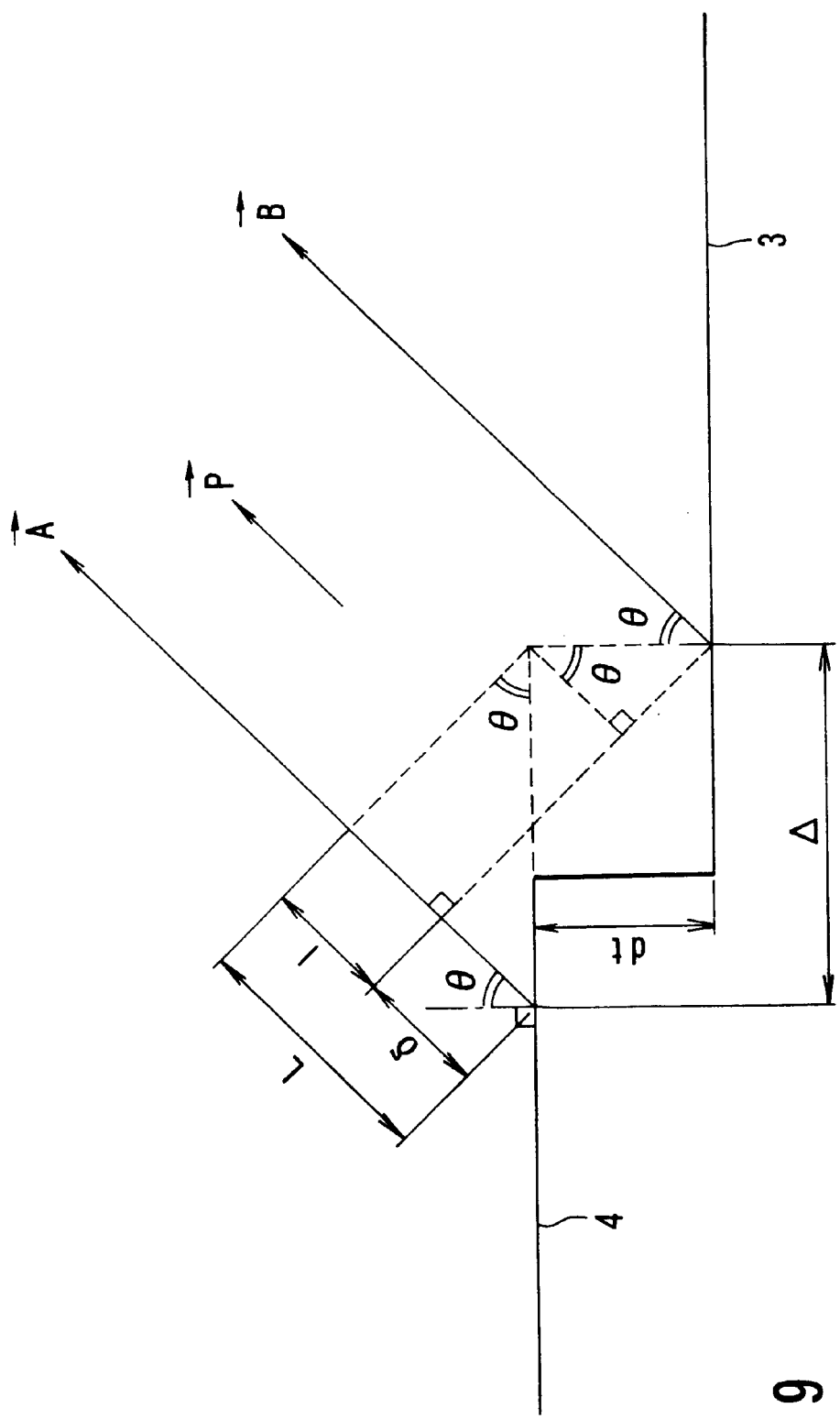
FIG. 9 is a schematic view for calculating an optical path difference of the laser beam shown in FIG. 8C.

From FIG. 9, $$L = \Delta \sin\theta, \ 1 = dt \cos\theta$$

Thus, $$\delta = L - 1 = \Delta \sin\theta - dt \cos\theta$$

Accordingly, the phase error between the two waves reflected in θ direction is given by $$\begin{aligned}dt - \delta &= dt(1 + \cos\theta) - \Delta\sin\theta \quad (9)\\ &= 2dt(\cos^2\theta/2) - 2\Delta\sin(\theta/2)\cos(\theta/2)\\ &= 2\cos(\theta/2)\{dt\cos(\theta/2) - \Delta\sin(\theta/2)\}\end{aligned}$$

In particular, when θ is sufficiently small, approximation is made as follows:

$$\cos(\theta/2) \approx 1, \ \sin(\theta/2) \approx \theta/2$$

Thus, equation (9) can be approximated as follows:

$$dt - \delta \approx 2dt - \Delta\theta \quad (10)$$

In association with equation (1), the complex amplitude of light reflected by the land portion 4 and propagating in the θ direction is given by $$Ar = A\exp(ikr) \tag{11}$$

In association with equation (4), the complex amplitude of light reflected by the groove 3 and propagating in the θ direction is given from equation (10) by $$Br = B\exp(ikr + ik2dt - ik\Delta\theta) \tag{12}$$

Accordingly, as regards the total complex amplitude of light propagating in the θ direction, the following modification is made in equation (7):

$$2dt \rightarrow 2dt - \Delta\theta$$

and the following equation (13) is obtained:

$$\psi = Ar + Br$$
$$= \exp(ikx)\{1 + i2B\sin(kdt - k\Delta\theta/2)\exp(ikdt - k\Delta\theta/2)\} \tag{13}$$

Furthermore, as regards the total amount of light propagating in the θ direction, the following modification is made in equation (8):

$$2dt 2dt - \Delta\theta$$

and the following equation (13) is obtained:

$$|\phi|^2 = 1 - \{1 - 4(B - 1/2)^2\}\sin^2(kdt - k\Delta\theta/2) \tag{14}$$
$$= 1 - \{1 - 4(B - 1/2)^2 \times \{\sin(kdt)\cos(k\Delta\theta/2) - \cos(kdt)\sin(k\Delta\theta/2)\}^2$$

In this case, $k\Delta\theta/2$ is regarded to be sufficiently small, and the following approximations are made:

$$\cos(k\Delta\theta/2) \approx 1,$$
$$\sin(k\Delta\theta/2) \approx k\Delta\theta/2, \text{ and}$$
$$(k\Delta\theta/2)2 \approx 0$$

Thus, equation (14) can be modified as follows:

$$|\phi|^2 \approx 1 - \{1 - 4(B - 1/2)^2\}\{\sin(kdt) - (k\Delta\theta/2)\cos(kdt)\}^2 \tag{15}$$
$$\approx 1 - \{1 - 4(B - 1/2)^2\}\{\sin^2(kdt) - (k\Delta\theta)\sin(kdt)\cos(kdt)\}$$
$$\approx 1 - \{1 - 4(B - 1/2)^2\}\{\sin^2(kdt) - (k\Delta\theta/2)\sin(k2dt)\}$$

When $\Delta = 0$ or when $\theta = 0$, equation (15) agrees with equation (8).

The polarity in the term, $(k\Delta\theta/2)\sin(k2dt)$, in equation (15) is reversed depending on the polarity (positive or negative) of $\Delta$, and also the polarity in $(k\Delta\theta/2)\sin(k2dt)$ is reversed depending on the polarity (positive or negative) of θ.

Accordingly, when a tracking error is detected by the push-pull method, light reflected by the recording film 34 is divided at wave front into two components, and a difference between the sum of light returning in the positive direction of θ and the sum of light returning in the negative direction of Δ is found to detect a variation amount of Δ. The direction of the tracking error is detected by finding whether the value Δ takes a positive value or a negative value.

If the characteristics of the term of equation (15) including $(k\Delta\theta/2)\sin(k2dt)$ are analyzed, there are the following features:

vi] When B=0 (groove width Wt=0, or with no groove), $|\psi|^2 = 1$ at any point irrespective of 0, and no tracking error is detected.

vii] When B=1 (groove width Wt being greater than converged beam spot size Ws), $|\psi|^2 = 1$ at any point irrespective of θ, and no tracking error is detected.

viii] When A=B=½ (the sum of amplitude of reflection light from the groove portions 3 coinciding with that of amplitude of reflection light from the land portions 4), $|\psi|^2$ takes a maximum value in relation to θ, $1 - \{\sin^2(kdt) - (k\Delta\theta/2)\sin(k2dt)\}$.

In other words, in this case, maximum interference occurs and a tracking error detection signal increases to a maximum level.

ix] When $k2dt = m\pi$ (m: an integer), $(k\Delta\theta/2)\sin(k2dt) = 0$ and no tracking error detection signal is obtained.

x] When $k2dt = (m+½)\pi$ (m: an integer (including zero or a negative value)), $|(k\Delta\theta/2)\sin(k2dt)$ takes a minimum value, $|k\Delta\theta/2|$, and a maximum tracking error detection signal is obtained.

Further consideration is given of the condition under which the maximum tracking error detection signal is obtained.

As mentioned above, the condition under which the maximum tracking error detection signal is obtained is $$k2dt = (m+½)\pi \tag{16}$$

If equations (2) and (3) are substituted in equation (16), $$dt = (m+½)\pi \times (\lambda_N/2\pi)/2 = \lambda/(8n) + \{(m\lambda)/(4n)\} \text{ (m: an integer including zero or a negative value)} \tag{17}$$

According to similar calculations, the condition under which no tracking error detection signal is obtained is $$dt = (m\lambda)/(4n) \text{ (m: an integer including zero or a negative value)} \tag{18}$$

Next, the condition for A=B is considered.

The diameter of a portion where the intensity of a converged spot center on the information storage medium is equal to $e^{-2}$ width is defined as converged spot size Ws. The amplitude distribution in a case where the converged beam spot amplitude distribution is approximated to Gauss distribution can be expressed by $$\psi(\rho) = \alpha\exp(-4\rho^2/Ws^2) \tag{19}$$

At this time, since the total amplitude value from the center to the radius, $\rho = \rho P$, is a definite integral value from $\rho = 0$ of $\psi(\rho)$ to $\rho = \rho P$, the following equation is obtained from equation (19):

$$B = \int 2\pi\rho\psi(\rho)d\rho \tag{20}$$

If $$\tau = -4\rho^2/Ws^2 \tag{21}$$

the following equation is obtained:

$$d\tau = -(8\rho/Ws^2)d\rho \tag{22}$$

Accordingly, equation (20) is modified to $$B = (\alpha\pi Ws^2/4)\{1 - \exp(-4\rho P^2/Ws^2)\} \tag{23}$$

If the condition for standardization is considered, $$\alpha = 4/(\pi W s^2) \quad (24)$$

Thus, from equations (23) and (24), the following equation is obtained:

$$B = 1 - \exp(-4\rho P^2/Ws^2) \quad (25)$$

From equation (25), the condition for B=½ is $$\rho p \approx 0.416 \, Ws \quad (26)$$

Accordingly, when a circular region such as pre-pit 2 is considered, if the diameter Wp thereof is $$Wp = 2\rho p \approx 0.833 \, Ws \quad (27)$$

B≈½, and a maximum detection signal is obtained under this condition.

The shortest pit shape of the pre-pit is a circular shape. Since the groove portion 3 has a stripe shape and extends linearly, it is narrower than the pre-groove width Wt (equation (27)) for the condition of B≈½.

Accordingly, the condition for obtaining a maximum tracking error detection signal is $$Wt \leq 0.833 \, Ws \quad (28)$$

Suppose that the light source wavelength of the information reproducing apparatus is λ and the numeral aperture of the objective lens 60 for converging the laser beam 61 on the information storage medium is NA. In this case, the converged spot size Ws, which is $e^{-2}$ width of the intensity of the converged beam spot center on the information storage medium at the time uniform-distribution light has been made incident on the objective lens 60, is given by $$Ws = 0.82\lambda/NA \quad (29)$$

For example, when light source wavelength λ=0.65 μm and NA=0.60, $$Ws = 0.82 \times 0.65 / 0.60$$
$$= 0.89 \, \mu m \quad (30)$$

In fact, however, the intensity distribution of the laser beam 61 incident on the objective lens 60 is not uniform. In many cases, the intensity distribution has a Gauss distribution. As a result, the converged spot size Ws on the recording film 34 is slightly greater than the above value (about 3 to 20%).

The necessary dimensions of the pre-groove 1 will now be explained by using the above-described formulae.

In order to obtain a tracking error detection signal, it is necessary, from formula (15) and item [vi], the width Wt of the groove portion 3 needs to be less than the converged spot size Ws. Accordingly, when the example of equation (30) is used, the condition, Wt<0.89 μm needs to be satisfied.

From formula (28), a maximum tracking error detection signal is obtained when Wt≈0.833 Ws (wt≈0.74 μm in the example of equation (30)) or slightly less.

As regards the depth of the pre-groove 1 (or the height of the stepped portion of the projecting portion defining the pre-groove), in order to obtain a tracking error detection signal, it is necessary, from equation (18), to avoid the condition:

$$dt = (m\lambda)/(4n)$$

The information reproducing apparatus can perform tracking error correction if the following formula is satisfied in formula (15):

$$|\sin(k2dt)| > 0.1 \quad (31)$$

The condition for satisfying equation (31) is given by $$m\pi + \pi/31 \leq k2dt \leq (m+1)\pi - \pi31 \quad (32)$$

Formula (32) may be developed to $$m\lambda/(4n) + \lambda/(124n) \leq dt \leq m\lambda/(4n) + (15\lambda)/(62n) \quad \text{(m: an integer)} \quad (33)$$

Accordingly, it is necessary to satisfy formula (33) as an essential condition for the stepped portion of the pre-groove 1.

Although the condition under which the tracking error detection signal becomes maximum is given by equation (17), the depth is set to be greater (or the size of the stepped portion is made larger) than the condition of equation (17) in connection with the information storage medium of the present invention wherein the land/groove recording is performed.

Figure 7:
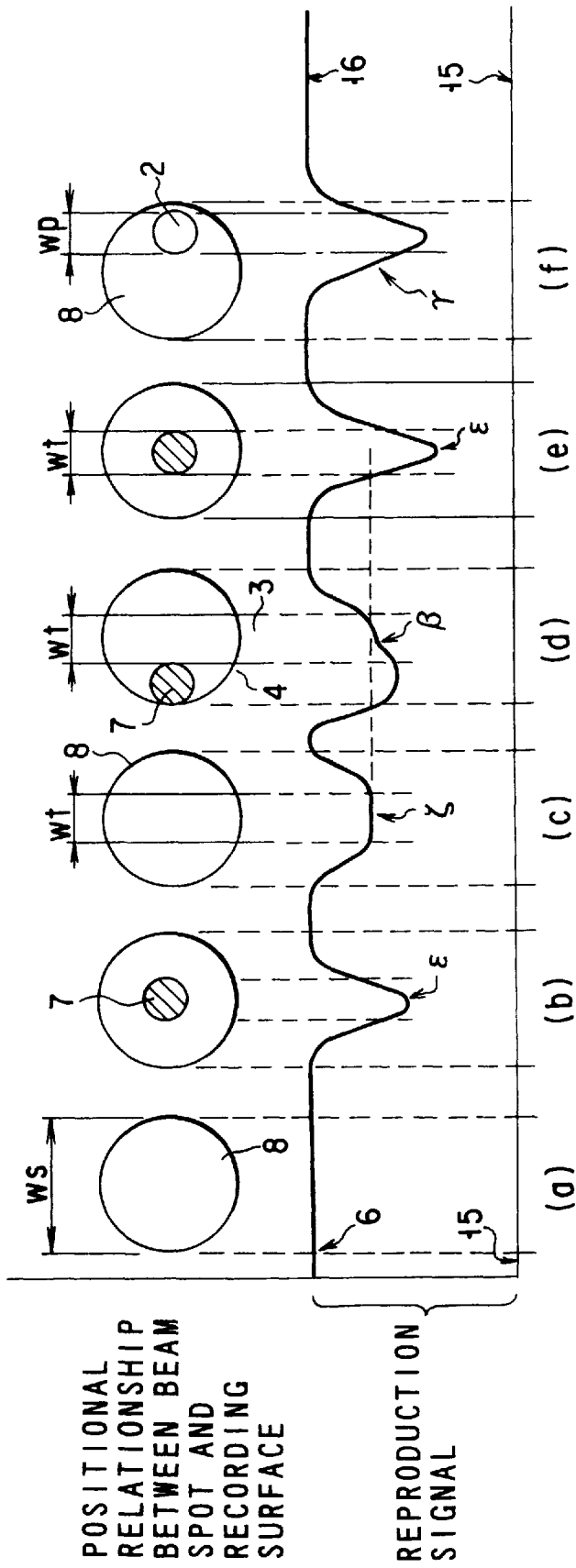
FIG. 7 is a schematic view for describing the level of a reproduction signal obtained by tracing the recording surface shown in FIG. 3.

With reference to FIG. 7, a method for forming a record mark 7 on the information storage medium by land/groove recording will now be described.

As shown in portion (a) of FIG. 7, a beam spot 8 of a reproducing laser beam with a spot size Ws is radiated on a mirror-surface portion of the recording film 34. The sum of the laser beam 61 totally reflected by the mirror-surface portion and returned to the objective lens 60 is expressed by 100% reflectance level 16. The reproduction signal detection level when no beam is reflected is expressed by reflectance 0-level 15.

The optical characteristics, magnetic characteristics or shape of the recording film 34 is varied by radiation of a large quantity of laser beam 61, thereby forming a write-once or rewritable record mark 7.

Alternatively, a phase-variable film is used as the recording film 34, and the phase of a local portion is changed to amorphous phase, compared to crystal phase of a surrounding portion, thereby forming a record mark 7. Basically, a signal is reproduced by detecting a variation in amount of a reproduction signal due to the presence/absence of record mark 7.

The optical reflectance within the record mark 7 is about half that in the peripheral crystalline region. When there is a positional relationship between the reproducing spot 8 and record mark 7, as shown in portion (b) of FIG. 7, the reproduction signal amount decreases to point ε.

When the reproducing spot 8 traces the pre-groove 1 with the width Wt, as shown in portion (c) of FIG. 7, the reproduction signal decreases to point ζ, as explained in connection with formula (1). As is clear from FIG. 8B, the reproduction signal decreases to point ζ since reflection light Ar from the land portion 4 and reflection light Br from the groove portion 3 interfere with each other and cancel each other in accordance with a phase difference therebetween. In this case, for example, if the reflection light amplitude A of reflection light Ar from the land portion 4 is decreased while the reflection light amplitude B from the groove portion 3 is kept constant, the amount of interference decreases and the canceling effect reduces.

Specifically, if the record mark 7 is located on the land portion 4, as shown in portion (d) of FIG. 7, the reflection light amplitude A from the land portion 4 is decreased. As a result, the amount interference between the reflection light Ar from the land portion 4 and the reflection light Br from the groove portion 3 can be decreased and the mutual cancellation effect also decreased.

This means that if the reflectance of the record mark 7 and the shape of the pre-groove 1 are optimized and the reproduction signal amount (point β) shown in portion (d) of FIG. 7 is made to coincide with the reproduction signal amount (point ζ) shown in portion (c) of FIG. 7, the reproduction signal amount can be made substantially constant, i.e. ζ≈β, irrespective of the presence/absence of the record mark 7 on the land portion 4.

As stated above, if good use is made of the interference effect, the record mark 7 recorded at the groove portion 3 can be stably reproduced without influence of crosstalk, for example, even if the record mark on the adjacent track (the land portion 4 in portion (d) of FIG. 7) enters the reproducing spot 8.

As is understood from the above description, the following conditions (I) and (II) are required to reduce crosstalk from an adjacent track in the land/groove recording.

I) The reflection variation of the recording mark 7 itself is small.

If a recording film 34 of the type wherein a hole is formed in the recording film 34 at the time of write-once recording is used, reflection light from the hole decreases greatly. As a result, the degree of decrease in amount of light from the record mark 7 is much greater than the effect of decreasing the interference between the land portion 4 and groove portion 3 and raising the level of point ζ in portion (c) of FIG. 7.

II) The reflection light level (signal level at point ζ in portion (c) of FIG. 7) of light from the pre-groove 1 is lower by a predetermined degree or more.

Even if the record mark 7 is located on the land portion 4 and the reflection light amplitude value A of light from the land portion is decreased, as shown in portion (d) of FIG. 7, the level variation in reproduction signal amount is small if the signal level at point ζ in portion (c) of FIG. 7 is high from the beginning. Due to influence of the decrease in reflectance by the record mark 7 as a single unit, the total reproduction signal level decreases.

In order to satisfy the condition (II), the stepped portion of the pre-groove 1 is optimized in the present invention.

Specifically, the condition for obtaining the maximum tracking error detection signal is expressed by formula (27). If the condition of formula (27) is substituted in equation (18), $\sin^2(kdt)=0.5$ and the condition B is not satisfied.

According to results of experiments and computer simulations, it is understood that the following condition is necessary to satisfy the condition (II):

$$\sin^2(kdt) > 0.5 \tag{34}$$

Since $m\pi + \pi/2 - \pi/4 < kdt < m\pi + \pi/2 + \pi/4$, the condition for satisfying formula (34) is given by $$m\lambda/(2n) + \lambda/(8n) < dt < mt/(2n) + 3\lambda/(8n) \tag{35}$$

(m: an integer; n: refractive index of plastic base plate)

Using formula (28), the width of the groove portion 3 is set at Wt≈0.833 Ws.

In a case where a phase variation film of GeSnTe is used as the recording film 34, the reflectance (reproduction signal level at point ε in portion (b) of FIG. 7) of light from the record mark 7 is about 50%. Compared to this condition, the dimension of the stepped portion (depth) of the pre-groove 1 most suitable for the land/groove recording is dt≈λ/(5n) as a result of computer simulation.

Figure 1:
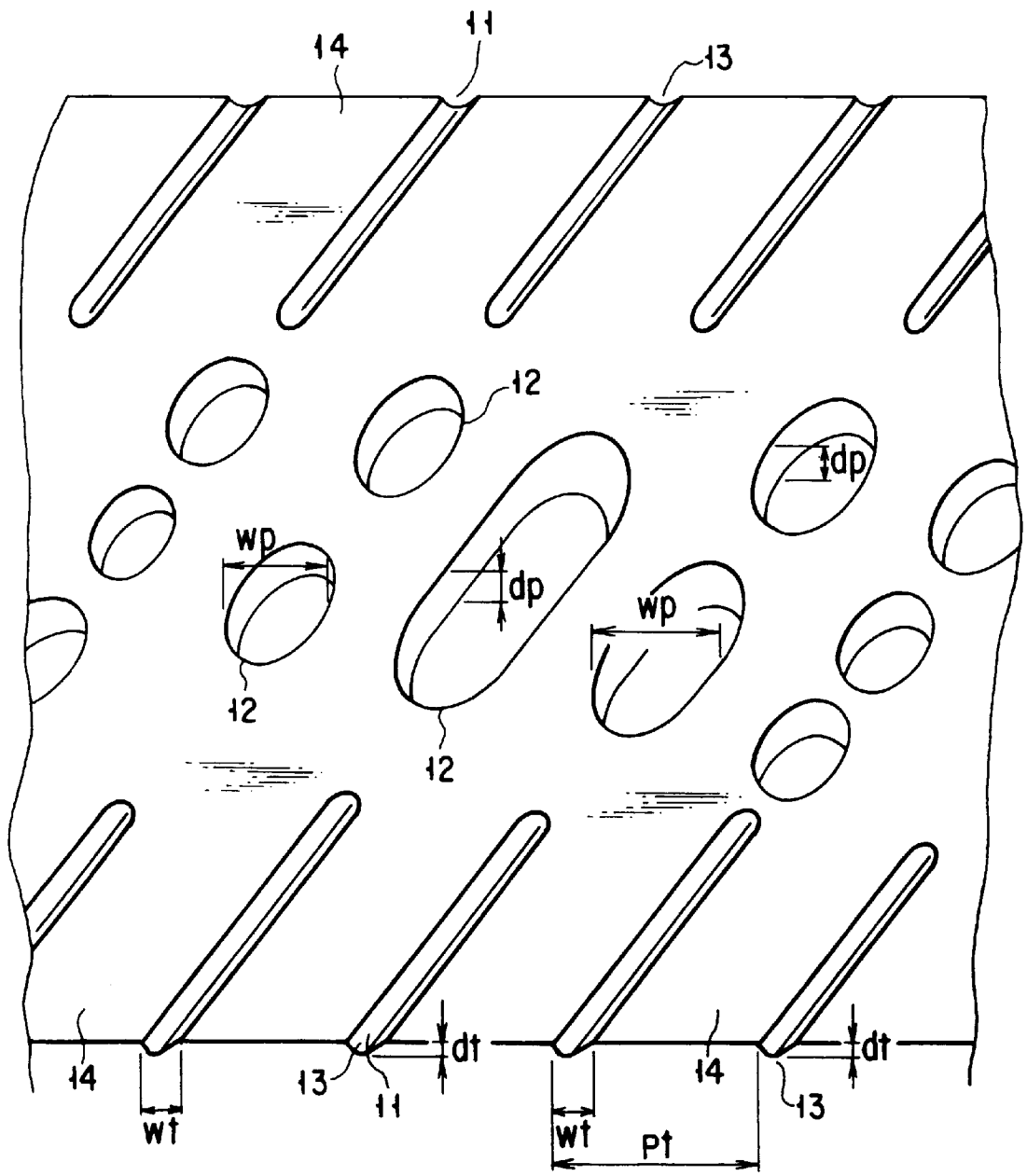
FIG. 1 schematically shows the condition of a recording surface of a conventional information storage medium.

In mentioned above, the photoresist layer 23 needs to comprise a single layer by reasons of manufacture. Because of this, the exposure amount of laser beam 25 on the photoresist layer 23 is controlled to form the shallow groove portion 13 with depth dt, as shown in FIG. 1. However, as mentioned above, the depth dt of the groove portion 13 varies greatly due to a slight change of the manufacturing conditions.

By contrast, according to the recording method for the information storage medium of the present invention, the depth and width of the pre-groove 1 and pre-pit 2 can be made substantially equal. Accordingly, the same conditions for exposure on the photoresist layer 23 can be adopted for the pre-groove 1 and pre-pit 2, and the manufacture is conducted easily and stably.

Record marks 7 are formed on both the land portion 4 and groove portion 3 of the pre-groove 1. If the pre-pits 2 are provided on both extensions of the land portion 4 and groove portion 3, the pre-pits 2 between adjacent tracks are located close to each other. Consequently, if the information of pre-pit 2 is reproduced, crosstalk of the pre-pit 2 on the adjacent track will occur.

To solve this problem, as shown in FIG. 3, the pre-pits 2 are displaced by Pt/4 from the center of the groove portion 3 or land portion 4 in the transverse direction (i.e. perpendicular to the direction of tracing of the reproducing spot).

At the time of information reproduction, the reproducing spot 8 moves along the slightly wobbling groove portion 3 or land portion 4. However, in fact, the reproducing spot 8 moves along a curved line obtained by connecting the centers of the wobbling groove portions 3 or land portions 4. The reproducing spot 8 passes over the pre-pit 2 at a position displaced by Pt/4 from the center of the pot 8, as L shown in portion (f) of FIG. 7. As a result, a reproduction signal can be obtained from the pre-pit 2 by a method similar to the push-pull method for tracking error detection.

The above-described formula (15) can represent the characteristics of the reproduction signal from the pre-pit, in the case where the detection method in which the reflection light from the information storage medium is divided at wave front by a straight line including the center and a difference between respective detection light amounts is found is applied to the pre-pit 2.

As is clear from FIG. 3 and portion (f) of FIG. 7, the center of the reproducing spot 8 departs greatly from the center of the pre-pit 2. Thus, a sufficiently large value of Δ can be obtained in formula (15).

In the above detection method, the condition for obtaining a large detection signal from the pre-pit 2 agrees with the condition for obtaining the aforementioned tracking error detection signal. Thus, if the dimension (depth or height) of the stepped portion of the pre-pit 2 is dp, the minimum condition to be satisfied by dp is, like formula (33), given by $$m\lambda/(4n) + \lambda/(124n) \leq dp \leq m\lambda/(4n) + (15\lambda)/(62n) \tag{36}$$

(m: an integer; n: refractive index of the base plate of the information storage medium)

However, it is difficult under the condition of formula (36) to obtain a stable reproduction signal having a sufficient margin for the information reproducing apparatus. Accordingly, in order to obtain a detection signal from the pre-pit 2, which is large and stable for the information reproducing apparatus, the following condition needs to be satisfied in formula (31):

$$|\sin(k2dt)| > 0.2 \tag{37}$$

In this case, the condition for satisfying formula (37) is $$m\pi + \pi/16 \leq k2dp \leq (m+1)\pi - \pi/16 \tag{38}$$

Thus, the following formula is obtained:

$$m\lambda/(4n)+\lambda/(64n) \leq dp \leq m\lambda/(4n)+(15\lambda)/(64n) \quad (39)$$

(m: an integer; n: refractive index of the base plate of the information storage medium)

A description will now be given of the condition of width Wp of the pre-pit 2, under which the reproduction signal is obtained from the pre-pit 2.

It is understood, from formula (15) that when B≈1 (the reproducing spot 8 entirely falling within the pre-pit 2), no reproduction signal is obtained.

Specifically, as described above, the center of the pre-pit 2 is displaced from the reproducing spot 8 by Pt/4. As is shown in portion (f) of FIG. 7, when $$Ws/2 < Wp/2 - Pt/4 \quad (40)$$

the reproducing spot 8 entirely falls within the pre-pit 2, and formula, B≈1, is satisfied.

Accordingly, from formula (40), an allowable 4e maximum value relating to the width Wp of the pre-pit 2 is given by the condition:

$$Wp < Ws + Pt/2 \quad (41)$$

A description will now be given of the minimum value of the width Wp of the pre-pit 2. In order to simplify analysis, suppose that the center of the pre-pit 2 agrees with the center of the reproducing spot 8.

From results of experiments and computer simulations, it is recognized that the minimum condition in formula (15) for obtaining the reproducing signal from the pre-pit is $$1 - 4(B - \tfrac{1}{2})^2 \geq 0.05 \quad (42)$$

If formula (42) is solved with respect to B, the following is obtained:

$$B \geq 0.0127 \quad (43)$$

From formulae (43) and (25), the condition for satisfying formula (43) is $$\rho p \geq 0.056 Ws \quad (44)$$

If the minimum width of the pre-pit 2 is Wp, the following is obtained from Wp=2ρp:

$$Wp \geq 0.11 Ws \quad (45)$$

Formula (45) indicates the calculation result in the case where the center of the reproducing spot 8 coincides with the center of the pre-pit 2.

In fact, as shown in portion (f) of FIG. 7, the centers of both are displaced by Pt/4.

If the position of the pre-pit 2 is displaced relatively, the allowable minimum value satisfying formula (43) becomes slightly greater than the value of formula (45). As an approximate minimum value of Wp, formula (45) is applied with no change.

Accordingly, the condition for reproducing a signal from the pre-pit 2 by the above detection method is as follows. For example, when the light source wavelength $\lambda=0.65$ μm and NA=0.60, from formula (45), Ws=0.89 μm from formula (30). Thus, the condition for the width of the pre-pit 2 is Wp≧0.1 μm.

The method for forming the pre-pit 2, as shown in FIG. 3, will now be described in brief with reference to FIG. 6.

When the pre-groove 1 is formed, the high-speed switch 46 remains turned on, and the laser beam 25 from the laser light source 47 passes through the EO modulator 44 without decreasing the light amount.

In order to form the pre-groove 1, the voltage of an output from the wobble groove generator/wobble pit switching device 48 varies at a fixed cycle and at a fixed amplitude. In accordance with the varying voltage, the output frequency of the specific frequency oscillator 42 varies.

In accordance with the variation in frequency, the direction of the laser beam 25 passing through the AO modulator 43 is slightly altered. Thus, as shown in FIG. 3, the pre-groove 1 is recorded while wobbling in a small range of amplitude.

If the position of the laser beam 25 shifts from the pre-groove 1 to the formation region of the pre-pit 2, the output voltage of the wobble groove generator/wobble pit switching device 48 varies greatly, and the output frequency of the specific frequency oscillator 42 is varied. As a result, the amount of deflection of the laser beam 25 which has passed through the AO modulator 43 varies, and the converged beam spot is radially moved on the photoresist layer 23 by a degree corresponding to half the distance between the groove portion 3 and land portion 4.

The pre-pits 2 have projections and recesses intermittently, as shown in the figures. In accordance with the shape of the pre-pits 2, ON/OFF signals are generated from the pre-pit signal generator 49 to drive the high-speed switch 46. Thus, the amount of laser beam 25 passing through the EO modulator 44 is switched.

Figure 10:
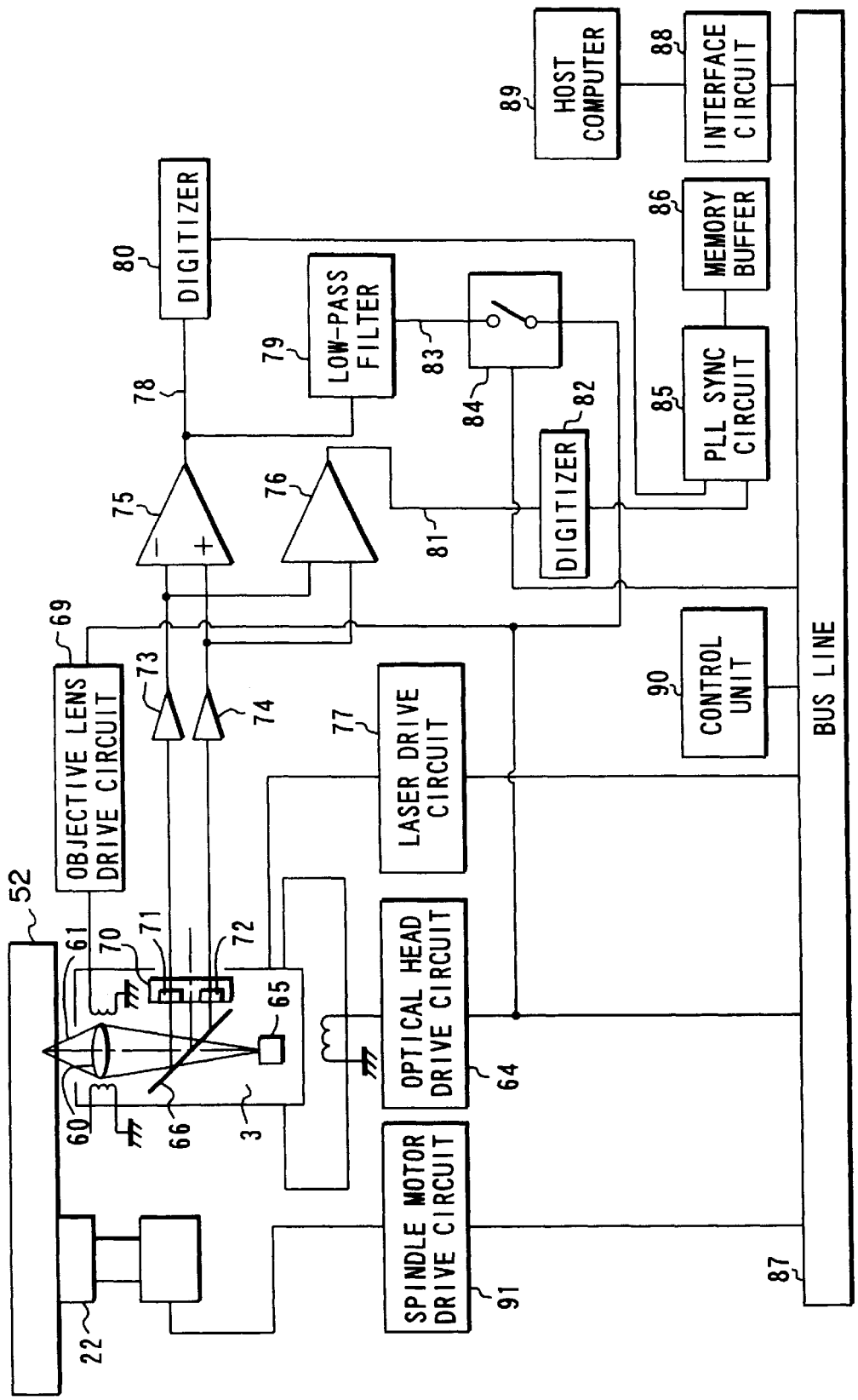
FIG. 10 is a schematic block diagram showing an information reproducing apparatus suitable for the information storage medium shown in FIG. 3.

FIG. 10 schematically shows an example of the structure of the information reproducing apparatus suitable for the above-described information storage medium.

The information storage medium 52 having the structure shown in FIG. 5F is rotated at a predetermined speed by a spindle motor 22.

The number of rotations of the spindle motor 22 is properly controlled by a spindle motor drive circuit 91 connected to a control unit 90 over a bus line 87. An optical head 63 is moved in the radial direction of the information storage medium 51 by an optical head drive circuit 64 connected to the bus line 87.

The light emission amount of a laser beam source 65 disposed in the optical head 63 is controlled by a laser beam drive circuit 77 so that a laser beam of a predetermined intensity is produced.

A laser beam 61 emitted from the laser beam source 65 passes through a half mirror 66 and is converged on the information storage medium 51 by means of an objective lens 60.

The laser beam 61 reflected by the information storage medium 51 and let to pass through the objective lens 60 once again is reflected by the half mirror 66 and guided to an optical detector 70.

The optical detector 70 has a first optical detection portion 71 and a second optical detection portion 72 and divides the laser beam 68 reflected by the information storage medium 51 into two components at wave front with respect to a straight line including the center axis of the beam. The divided components are detected by the first and second optical detection portions 71 and 72, respectively.

Signals obtained by the optical detection portions 71 and 72 are current/voltage converted by preamplifiers 73 and 74.

Signals obtained by the preamplifiers 73 and 74 are added by an adder 76 and the added signal is used as a reproduction signal 81 from the record mark 7. In addition, the signals obtained by the preamplifiers 73 and 74 are differentiated by a differential circuit 75, and an output from the differential circuit 75 is used as a reproduction signal 78 from the pre-pit 2.

The reproduction signal 81 from the record mark 7 and the reproduction signal 78 from the pre-pit 2 are digitized by digitizing circuits 82 and 80 respectively and delivered to a PLL sync circuit 85. An output from the PLL sync circuit 85 is stored in a memory buffer 86 as a reproduction digital signal. The reproduction digital signal is then output to a host 89 via an interface 88 over the bus line 87, upon request by the host 89 side.

Portion of the reproduction signal 78 from the pre-pit 2 is passed through a low-pass filter 79 and used as a tracking error detection signal 83.

Specifically, the portion of the reproduction signal 78 is passed through a switching circuit 84 by control of the control unit 90 and delivered to the objective lens drive circuit 69 to move the objective lens 61 in a desired direction.

In addition, portion of the tracking error detection signal 83 is supplied to the optical head drive circuit 64 to move the optical head 63 in a radial direction of the information storage medium 51.

A description will now be given of a reproduction signal obtained by reproducing information recorded on the information storage medium 51 having the structure shown in FIG. 3 by using the information reproducing apparatus shown in FIG. 10.

Figure 11:
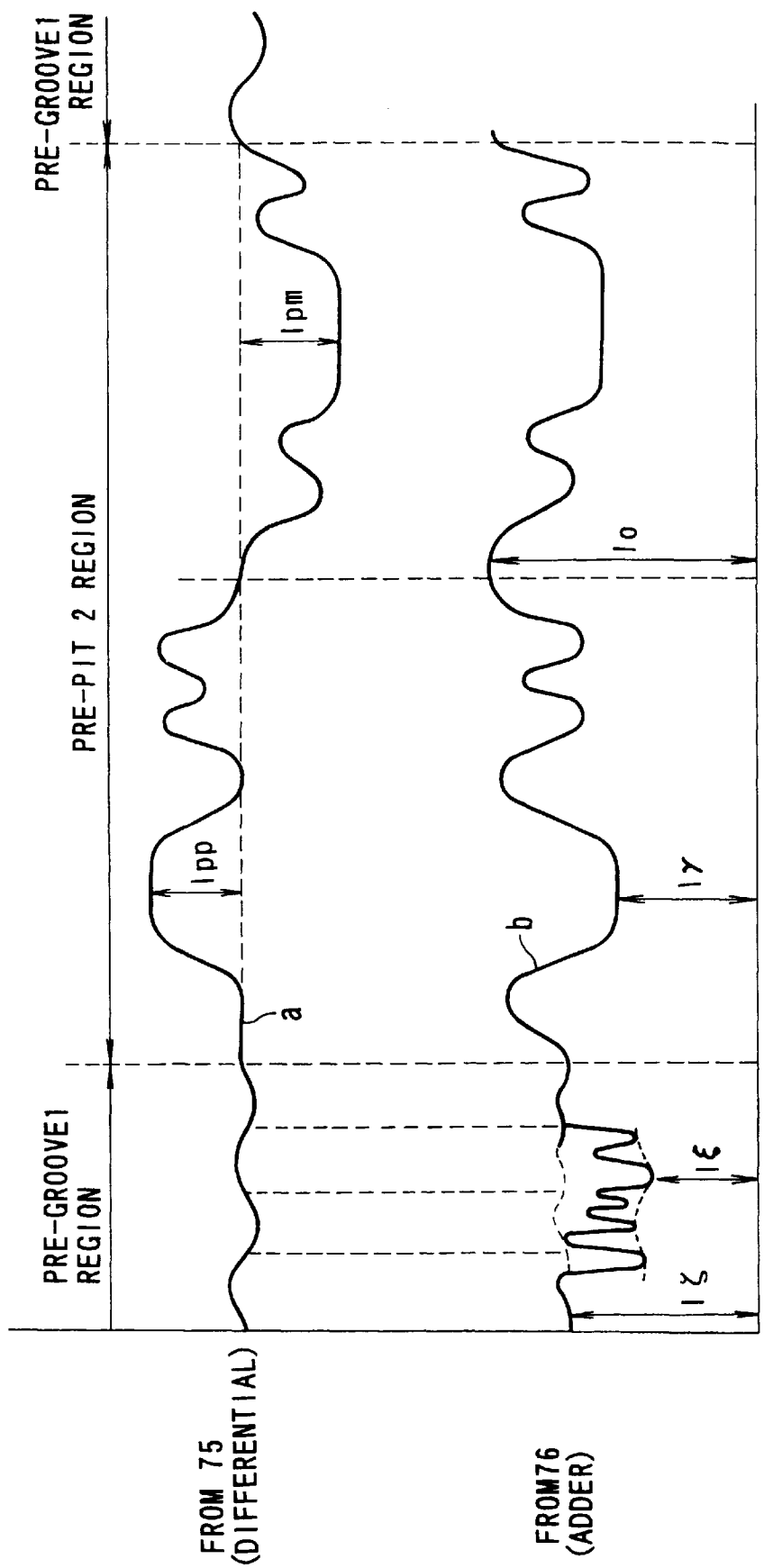
FIG. 11 is a schematic diagram showing a reproduction signal obtained by the information reproducing apparatus shown in FIG. 10.

FIG. 11 shows an output signal a from the differential circuit 75 and an output signal b from the adder 76.

Since the pre-groove 1 of the information storage medium shown in FIG. 3 is wobbling in a small range of width, the reproduction Signals a and b fluctuate up and down, as shown in FIG. 11, in accordance with the wobbling of the pre-groove 1 while the reproducing beam spot is tracing the groove portion 3 of the pre-groove 1.

A signal level at the time no light is returned from the information storage medium 51 is used as a reference level. A signal amount between the reference level and a maximum amplitude value associated with the groove portion 3 or land portion 4 is indicated by I$\zeta$ of the signal b. In the case where the record mark 7 is formed on the groove portion 3 or land portion 4, a signal amount between the reference level at which no light is returned and a minimum signal level associated with the record mark 7 is indicated by I$\xi$ of the signal b. The signal amount I$\zeta$ corresponds to the signal level at point $\zeta$ in portion (c) of FIG. 7, and the signal amount I$\xi$ corresponds to the signal level at point $\xi$ in portion (e) of FIG. 7.

When the converged beam spot is to trace the region of the pre-pit 2, the spot traces a position displaced from the center of the pre-pit 2 by Pt/4, since the center of the pre-pit 2 is displaced from the center of the groove portion 3 or land portion 4 by Pt/4, as mentioned above.

At this time, the output signal level of the adder 76 is I$\gamma$, as shown in signal level line b in FIG. 11. On the other hand, the signal level of the portion in the pre-pit region, where the pre-pit 2 is not provided, is Io. The level Io corresponds to the signal level at the position shown in portion (a) of FIG. 7.

The polarity of the output from the differential circuit 75 at the time the converged beam spot passes over the region of the pre-pit 2 changes, depending on whether the pre-pit 2 is located on the right side or left side of the tracing position of the converged beam spot. A plus-side signal amplitude of the output of the differential circuit 75 in the region of pre-pit 2 is indicated by Ipp, and a minus-side signal amplitude is by Imp.

Referring to formula (15), the condition of $|\psi|^2=1$ needs to be satisfied when the output signal of the adder 76 is Io.

Thus, in order to obtain a proper reproduction signal of the pre-pit 2 as an output from the differential circuit 75, it is necessary, from formulae (37) and (15), to satisfy $$|Ip|/Io > 0.1 \qquad (46)$$

Formula (46) relates to both Ipp and Imp, and the following formulae are obtained:

$$Ipp/Io > 0.1 \qquad (47)$$

and $$Imp/Io > 0.1 \qquad (48)$$

Formulae (47) and (48) coincide with the conditions of the above-mentioned formula (31). In order to more stably obtain the reproduction signal of the pre-pit 2 from the output of the differential circuit 75, the conditions of formulae (47) and (48) are preferably set, from formulae (37) and (15), to:

$$Ipp/Io > 0.2 \qquad (49)$$

and $$Imp/Io > 0.2 \qquad (50)$$

Figure 2:
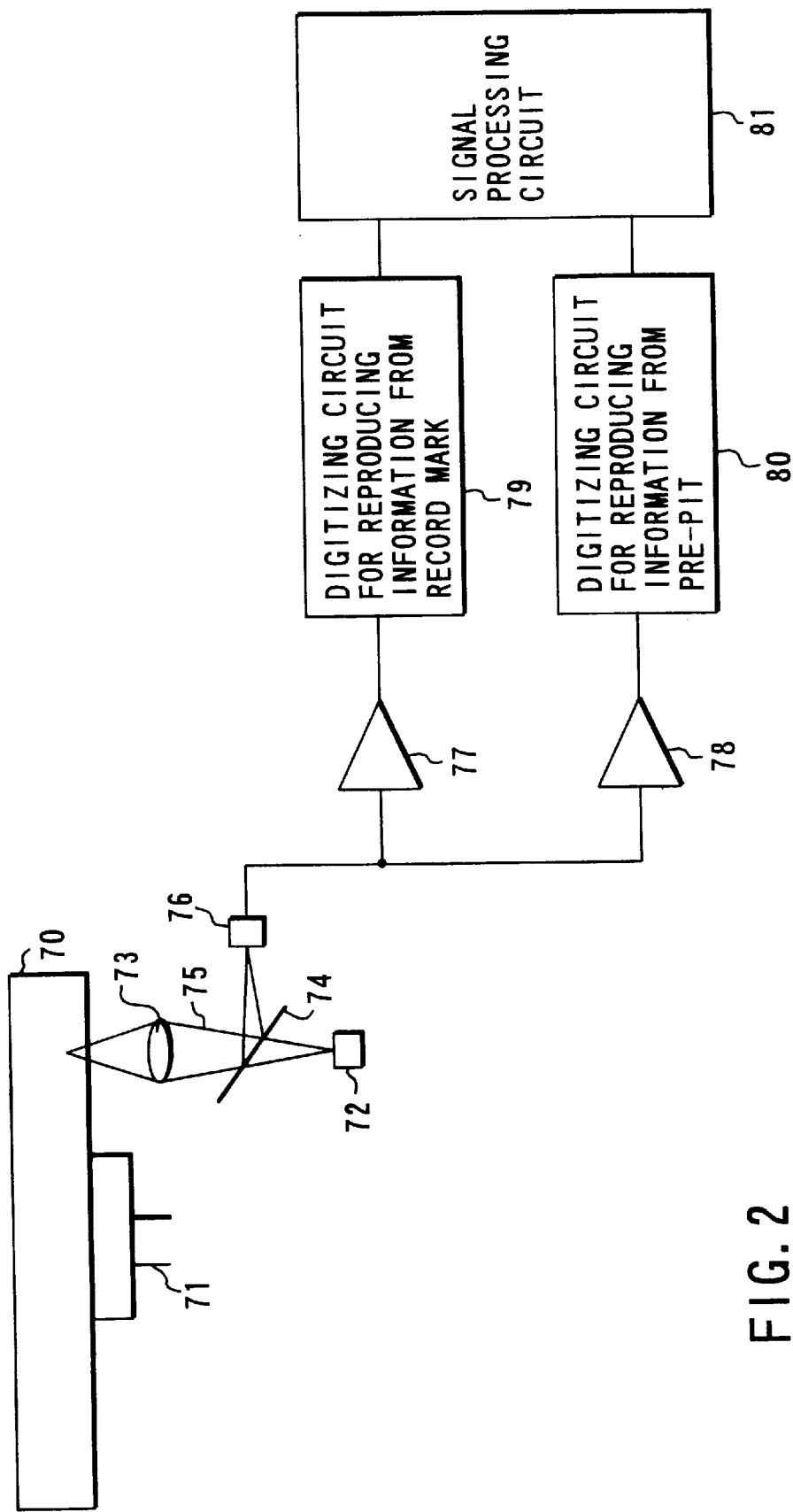
FIG. 2 schematically shows an example of an information reproducing apparatus for reproducing information from the information storage medium shown in FIG. 1.

FIG. 2 schematically shows an example of the structure of a conventional information reproducing apparatus, for comparison with the information reproducing apparatus of the present invention as shown in FIG. 10.

As is shown in FIG. 2, in the prior art, a reproduction signal amplitude obtained from the pre-pit 12 (see FIG. 1) differs greatly from a reproduction signal amplitude obtained from the record mark 7, and there is a need to provide preamplifiers 77 and 78 and digitizing circuits 79 and 80 for the respective signals. Compared to the information reproducing apparatus of the invention shown in FIG. 10, the circuit configuration of the conventional apparatus is more complex.

As has been described above, in the prior art, the depth of the pre-groove is intentionally made different from that of the pre-pit, and the productivity is deteriorated. In the present invention, however, the depth of the pre-groove is equalized to that of the pre-pit. In addition, a very large reproduction signal can be obtained from the pre-pit portion by detecting, like a push-pull type tracking error detection method, a tracking error by dividing reproduction light at wave front by a straight line including the center of the reproduction light and finding a difference in detection light amount between the divided components, and thus the detection signal is prevented from becoming unstable.

Thereby, the manufacture of the primary disk of the information storage medium is simplified, a variance in characteristics among manufacturing lots is limited to a minimum, and the manufacturing yield is increased. Therefore, the manufacturing cost of information storage media can be reduced.

Even if physical dimensions of the information storage medium slightly vary, a substantially constant detection signal amount is stably obtained. Therefore, the information reproducing apparatus can be stably operated.

Moreover, since the detection signal matching with the signal detection method of the information reproducing apparatus is provided, the signal detection of the information reproducing apparatus can be stabilized.

As has been described above, according to the present invention, the pre-pit is slightly wobbled and displaced from the extension (center line) of the groove portion or land portion. Thus, the detection light can be divided at wave front into two components, and a signal from the pre-pit can be detected from a difference in light amount between the two components.

Accordingly, the dimensions of the stepped portions of the pre-pits on the information storage medium can be defined so that a large detection signal can be obtained from the pre-pit. Thereby, a very large detection signal can be obtained as a reproduction signal, the S/N of the detection signal can be increased, and the error rate can be reduced.

Furthermore, according to the present invention, the depth of the pre-groove can be set to be substantially equal to that of the pre-pit (dt≈dp). Thus, this invention can provide the information storage medium, wherein when the pre-groove and pre-format are formed, the photoresist layer can be exposed by a laser beam as deep as the glass plate (i.e. the pre-groove and pre-format can be formed deeper). If it is supposed that the transfer efficiency in each step is 100%, the depths of the pre-groove and pre-pit can be controlled only by controlling the thickness of the photoresist layer. Thus, the management of the manufacturing steps is easy. Thereby, the manufacturing yield is increased, and the cost of the information storage medium is reduced.

Besides, according to the present invention, the dimensions of the stepped portions and the widths of the pre-grooves and pre-pits can be made substantially equal (dt≈dp, and Wt≈Wp). Thus, the recording conditions of the primary disk by the primary disk recording apparatus are stabilized. Accordingly, the productivity and reproducibility of information storage media are enhanced, and the cost of information storage media is reduced. In other words, since the widths of the pre-groove and pre-pit are substantially equalized (wt≈Wp), the exposure light amount of the exposure apparatus can be made equal and it suffices to set the exposure light amount and alter the position of exposure at the time of forming the primary disk of the information storage medium. Therefore, the information storage medium, from which reproduction signals can be stably obtained, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium permitting reproduction of information using converged light, comprising:
   a wobbling pre-groove region having a groove-like, continuous projection-and-recess shape; and
   a pre-pit region having intermittent projection-and-recess shape,
   wherein the wobbling pre-groove region includes a groove portion in a pre-groove and a land portion between grooves, and pre-pits are arranged at positions departing from an extension line of the pre-groove or an extension line of the land portion and,
   wherein, a reflected light is detected by using a detector having two detecting regions for the tracking so that the relationship $|Ip|/Io>0.1$ is satisfied, where Io represents a sum of output currents from the two detecting regions corresponding to the reflected lights from the groove portion or the land portion, and Ip denotes a difference between the output signals from the two detecting regions.

2. The information storage medium according to claim 1, wherein the following formula is satisfied:

$$Wp<Ws+Pt/2$$

where
   Ws: a spot size of the converged light used in information reproduction,
   Wp: a width of the pre-pit, and
   Pt: a pitch between the pre-grooves.

3. The information storage medium according to claim 1, wherein the following formula is satisfied:

$$Wp \geq 0.11 Ws$$

where
   Ws: a spot size of the converged light used in information reproduction, and
   Wp: a width of the pre-pit.

4. An information reproducing apparatus capable of reproducing information from an information storage medium using converged light, characterized by comprising:
   a light source;
   an optical detector for detecting light emitted from the light source and reflected by the information storage medium, the optical detector including a first optical detection portion for detecting a first light component reflected by the information storage medium and a second optical detection portion for detecting a second light component reflected by the information storage medium, and
   a differential circuit for finding a difference between a first signal obtained from the first optical detection portion and a second signal obtained from the second optical detection portion,
   wherein a reproduction signal from a pre-pit recorded on the information recording medium is obtained by using an output signal from the differential circuit, said recording medium being capable of providing a reflected light meeting the relationship $|Ip|/Io>0.1$, where Io represents a sum of output currents from the two detecting regions corresponding to the reflected lights from the groove portion or the land portion, and Ip denotes a difference between the output signals from the two detecting regions when a reflected light is detected by using a detector having two detecting regions for the tracking.

5. An information reproducing apparatus capable of recording or reproducing, with use of converged light, information in or from an information storage medium having a pre-groove with a groove-like, continuous projection-and-recess shape and a pre-pit with an intermittent projection-and-recess shape, the information storage medium permitting write or rewrite using converged light, the apparatus characterized by comprising:
   at least one system of a differential circuit for reproducing a signal from the pre-pit; and
   at least one system of an adder for reproducing information from a recorded mark formed by write or rewrite, wherein the following condition is satisfied:

$$|Ip|/Io>0.1$$

where
   Io: an output signal from the adder in association with the wobbling pre-groove or a wobbling nonpregroove portion without said projection-and-recess shape, and Ip: a signal amplitude of an output from the differential circuit.

6. An information reproducing apparatus capable of recording or reproducing, with use of converged light, information in or from an information storage medium having a pre-groove with a groove-like, continuous projection-and-recess shape and a pre-pit with an intermittent projection-and-recess shape, the information storage medium permitting write or rewrite using converged light, the apparatus characterized by comprising:

at least one system of a differential circuit for reproducing a signal from the pre-pit; and at least one system of an adder for reproducing information from a recorded mark formed by write or rewrite, wherein the following condition is satisfied:

$$|Ipp|/Io > 0.1$$

where
Io: an output signal from the adder in association with the wobbling pre-groove or a wobbling nonpre-groove portion without said projection-and-recess shape, and Ipp: a signal amplitude of a positive output from the differential circuit.

7. The information reproducing apparatus according to claim 6, wherein the range of Ipp/Io satisfies the condition of $$Ipp/Io > 0.2.$$

8. An information reproducing apparatus capable of recording or reproducing, with use of converged light, information in or from an information storage medium having a pre-groove with a groove-like, continuous projection-and-recess shape and a pre-pit with an intermittent projection-and-recess shape, the information storage medium permitting write or rewrite using converged light, the apparatus characterized by comprising:

at least one system of a differential circuit for reproducing a signal from the pre-pit; and at least one system of an adder for reproducing information from a recorded mark formed by write or rewrite, wherein the following condition is satisfied:

$$|Imp|/Io > 0.1$$

where Io: an output signal from the adder in association with the wobbling pre-groove or a wobbling nonpre-groove portion without said projection-and-recess shape, and Imp: a signal amplitude of a negative output from the differential circuit.

9. The information reproducing apparatus according to claim 8, wherein the range of Imp/Io satisfies the condition of $$Imp/Io > 0.2.$$

10. An information reproduction apparatus capable of recording or reproducing of information in and from an information recording medium with use of converged light, said recording medium having a wobbling pre-groove region having a groove-like, continuous projection-and-recess shape, and a pre-pit region having intermittent projection-and-recess shape and permitting write or rewrite with use of converged light, wherein the pre-groove region includes a groove portion in a pre-groove and a land portion between grooves, and pre-pits are arranged at positions departing from an extension line of the pre-groove or an extension line of the land portion, and wherein, when a reflected light is detected by using a detector having two detecting regions for the tracking, the relationship |Ip|/Io>0.1 is satisfied, where Io represents a sum of output currents from the two detecting regions corresponding to the reflection lights from the groove portion or the land portion, and Ip denotes a difference between the output signals from the two detecting regions, said information reproduction apparatus comprising:

a light source;

an optical detector for detecting light emitted from the light source and reflected by the information storage medium, the optical detector including a first optical detection portion for detecting a first light component reflected by the information storage medium and a second optical detection portion for detecting a second light component reflected by the information storage medium; and a differential circuit for finding a difference between a first signal obtained from the first optical detection portion and a second signal obtained from the second optical detection portion, wherein a reproduction signal from a pre-pit recorded on the information recording medium is obtained by using an output signal from the differential circuit, said recording medium being capable of providing a reflected light meeting the relationship |Ip|/Io>0.1, where Io represents a sum of output currents from the two detecting regions corresponding to the reflected lights from the groove portion of the land portion, and Ip denotes a difference between the output signals from the two detecting regions, when a reflected light is detected by using a detector having two detecting regions for the tracking.

* * * * *